United States Patent [19]

Denison et al.

[11] Patent Number: 5,539,598

[45] Date of Patent: Jul. 23, 1996

[54] ELECTROSTATIC PROTECTION FOR A SHIELDED MR SENSOR

[75] Inventors: Edward V. Denison; Vincent N. Kahwaty; Antonio Rubio; Joseph M. Schmalhorst, all of Tucson, Ariz.

[73] Assignee: International Business Machines Corporation, Armonk, N.Y.

[21] Appl. No.: 354,753

[22] Filed: Dec. 8, 1994

[51] Int. Cl.[6] .................. G11B 5/39; G11B 5/31
[52] U.S. Cl. ................ 360/113; 360/121; 360/126
[58] Field of Search ................... 360/102–104, 360/113, 125, 126, 128, 97.02, 121

[56] References Cited

U.S. PATENT DOCUMENTS

| | | | |
|---|---|---|---|
| 4,317,149 | 2/1982 | Elser et al. | 360/126 |
| 4,516,179 | 5/1985 | Imakoshi et al. | 360/113 |
| 4,800,454 | 1/1989 | Schwarz et al. | 360/103 |
| 4,802,043 | 1/1989 | Sato et al. | 360/113 |
| 4,972,286 | 11/1990 | Jurisch et al. | 360/126 |
| 5,065,483 | 11/1991 | Zammit | 360/113 |
| 5,142,425 | 8/1992 | Gailbreath Jr. et al. | 360/97.02 |
| 5,161,299 | 11/1992 | Denison et al. | 29/603 |
| 5,206,590 | 4/1993 | Dieny et al. | 360/113 |
| 5,247,413 | 9/1993 | Shibata et al. | 360/113 |
| 5,272,582 | 12/1993 | Shibata et al. | 360/113 |
| 5,375,022 | 12/1994 | Gill et al. | 360/113 |
| 5,420,736 | 5/1995 | Heim et al. | 360/113 |

FOREIGN PATENT DOCUMENTS

| | | | |
|---|---|---|---|
| 62-159317 | 7/1987 | Japan | 360/113 |
| 5-151533 | 6/1993 | Japan | 360/113 |
| 6-243434 | 9/1994 | Japan | 360/113 |

OTHER PUBLICATIONS

IBM Technical Disclosure Bulletin; vol. 24, No. 4; Sep. 1981; Schwarz; "Perpendicular Recording Read/Write Head With High Reluctance Leg".
Barkley, et al., "Thin–Film Transducer Protection", Feb., 1975, IBM Tech. Discl. Bulletin, vol. 17, No. 9, pp. 2549.

Primary Examiner—Stuart S. Levy
Assistant Examiner—Jefferson Evans
Attorney, Agent, or Firm—F. E. Anderson

[57] ABSTRACT

A magneto-resistive (MR) head includes protection from electrostatic discharge without introducing additional processing steps. The MR sensor comprises a soft film biased (SFB) magnetic read sensor sandwiched between two high resistivity magnetic materials. The MR sensor is located between two MR shields wherein each MR shield is connected to an MR sensor ground signal lead by a resistor. The resistor is constructed from the high resistivity magnetic material such that the resistor is deposited at the same process step as the MR sensor.

12 Claims, 5 Drawing Sheets

ELECTROSTATIC PROTECTION FOR A SHIELDED MR SENSOR

FIELD OF THE INVENTION

The present invention relates generally to magnetic recording and more particularly, to a thin film magneto-resistive (MR) head having a protection from electrostatic discharge.

BACKGROUND OF THE INVENTION

Business, science and entertainment applications depend upon computers to process and record data, often with large volumes of the data being stored or transferred to nonvolatile storage media. The non-volatile storage media typically includes magnetic discs, magnetic tape cartridges, optical disk cartridges, floppy diskettes, or floptical diskettes. The advantages of storing data on non-volatile storage media are numerous, including: a capability of storing hundreds of megabytes or even gigabytes of data (additional cartridges can be used to store still more data); providing a vehicle for long term storage and archival; backing up that data which resides on non-removable media; and providing a convenient vehicle for transferring data between computers. Typically, magnetic tape media is the most economical means of storing or archiving the data.

The amounts of data stored, accessed and processed by computers has increased as the computing power of the internal processors has increased. Hence, storage technology is continually pushed to increase storage capacities (as well as storage reliability). Improvements in storage densities in magnetic storage mediums, for example, has come in many areas including improved medium materials, improved error correction techniques, and decreased bit sizes. The amount of data stored on half inch magnetic tape, for example, has increased from megabytes of data stored on nine data tracks to gigabytes of data stored on 128 tracks of data.

The improvement in data densities on magnetic storage media, is due in large part to improvements made in the transducer used for reading and writing data to the magnetic storage medium. A major improvement in transducer technology has been realized with the magneto-resistive (MR) transducer developed by the IBM corporation. The MR transducer detects magnetic field signals as resistance changes in an MR stripe. Data densities can be increased using an MR transducer because signal levels for the MR transducer are typically much higher than for conventional inductive read heads. Furthermore, the output of the MR transducer depends only on the instantaneous magnetic field from the media and is independent of media velocity or time rate of change of the sensed fields.

Magnetic tape (and to some extent magnetic disks) is passed very near or directly over the MR transducer for reading data therefrom and writing data thereto. A buildup of static charge on the media, if allowed, could cause single or double bit failures, or worst could damage the sensitive MR transducer, thereby unacceptably reducing reliability. In the past, low resistive magnetic tape media, such as chromium-oxide magnetic tape, allowed static charge buildup to bleed off through the tape housing or at other points along the tape path. The inventors of the present invention have discovered, however, that higher resistivity media, for example, metal particle media, under certain atmospheric conditions, does not allow sufficient bleed off of static charge buildup.

Thus, what is needed is a MR transducer having protection for effectively discharging static charge buildup.

SUMMARY OF THE INVENTION

An object of the present invention is to provide an improved magneto-resistive head.

Another object of the present invention is to provide a magneto-resistive head having electrostatic protection.

Yet another object of the present invention is to provide a magneto-resistive head having electrostatic protection wherein the protection means is realized without additional processing steps.

According to a first embodiment of the present invention, a magneto-resistive (MR) head is provided, including at least one write gap for providing magnetic flux signals and at least one corresponding MR read transducer for reading magnetic flux signals. At least one MR shield pair is provided for shielding the magnetic flux signals from the at least one MR read transducer until the magnetic flux signals are within a predetermined distance from the MR read transducer. A resistor is coupled between the at least one MR shield pair and a ground terminal for discharging static charge buildup from the MR head.

In another embodiment of the present invention, in a magnetic tape drive, a method of reducing single and double bit errors due to static charge build-up and discharge at a magneto-resistive (MR) head due to a magnetic storage medium passing by the MR head, wherein the MR head includes a plurality of MR read transducers and a corresponding plurality of write transducers. The method includes the steps of shielding each MR read transducer with first and second MR shields and providing a resistive path from each MR shield to a ground lead of each MR read transducer of the plurality of MR read transducers. The magnetic storage medium is passed by the MR head, and any static charge buildup on the MR head is shunted from each MR shield through the resistive path to ground.

The foregoing and other objects, features, and advantages of the invention will be apparent from the following more particular description of a preferred embodiment of the invention, as illustrated in the accompanying drawing.

DETAILED DESCRIPTION OF THE INVENTION

Figure 1:
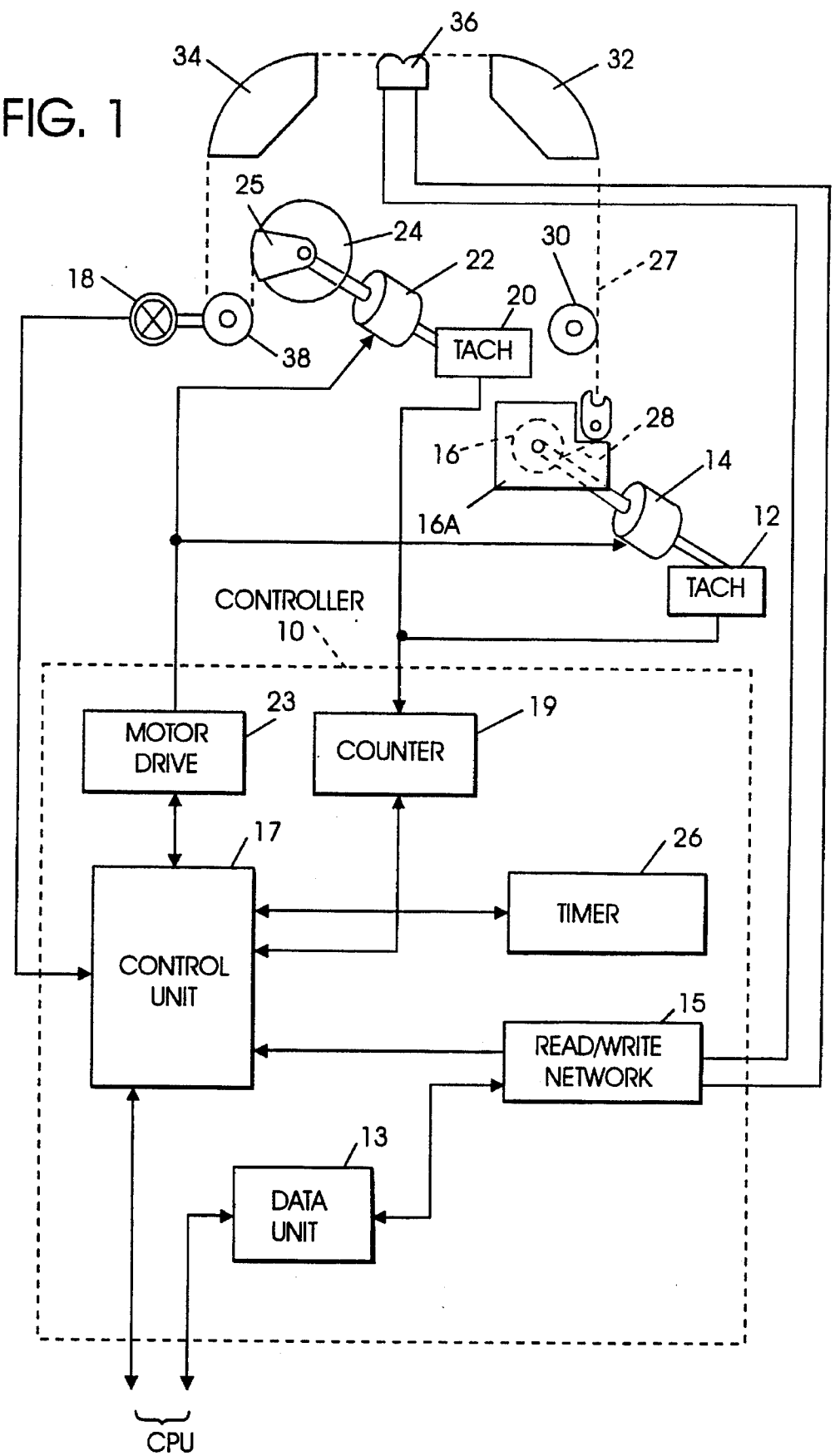
FIG. 1 is a schematic diagram of a tape drive and controller useful with the magnetic head according to the present invention.

Referring now to the drawing, like numerals correspond to like parts depicted in the figures. The invention will be described as embodied in an automated magnetic tape storage system for use in a data processing environment. Although the invention is shown using magnetic tape cartridges, one skilled in the art will recognize that the invention equally applies to magnetic heads used in direct access storage devices (DASD). Furthermore, the description of a magnetic tape storage system is not meant to limit the invention to data storage applications as the invention described herein can be applied to magneto-resistive heads in general.

Interleaved magnetic tape heads are useful for reading and writing magnetic transitions from a multi-track recording medium as is well known in the art. A typical tape drive system is the IBM 3490 tape drive. In a tape drive system, the MR head may remain fixed while the tape is moved across the MR head in both directions to read and write from various transducers in the MR head for reading or recording data to one or more of a plurality of tracks on the tape. Alternately, the MR head can be moved transversely to the tape for accessing a greater number of tracks on the tape than the number of transducers existing on the MR head. The interleaved MR head makes it possible to increase a number of tracks while providing bi-directional operation of the medium and simultaneous permitting an immediate read back check of data just written onto the medium (read after write). More tracks are made possible by reducing feature sizes of the read and write transducers. As the feature sizes are reduced, reading and writing accuracy becomes ever more sensitive to environmental conditions, including static charge buildup on the medium.

FIG. 1 shows a controller 10 accepting information from a supply reel tachometer 12 which is connected to a supply reel motor 14. The supply reel motor 14 is driven by a motor drive circuit 23 to reversibly rotate a supply reel 16 shown within a single supply reel cartridge 16A. The tachometer 12 directs count pulses to a counter 19 to indicate the number of rotations and the rotational position of the motor 14 and hence the supply reel 16. The output of the counter 19 is directed to a control unit 17. Another input of the control unit 17 is via the counter 19 that accepts count pulses from a take up reel tachometer 20. The tachometer 20 is connected to a take up reel motor 22 that is reversibly driven by the motor drive 23 which applies torque under control of the control unit 17. The motor 22 drives a take up reel 24. A timer 26 is connected to the control unit 17 in the controller 10 to control the application of the motor drive 23 power to the motors 14 and 22.

A magnetic tape 28 and its leader block takes a path, shown by dotted line 27, from the supply reel 16 to the take up reel 24 past an idler bearing 30, air bearing tape guides 32 and 34, and an MR head 36. The tape path 27 continues around a roller 38 of a tension arm transducer 18 to the take up reel 24. An output of the MR head 36 is connected to a read/write network 15. The read/write network 15, under control of the control unit 17, directs data to a data unit 13 in the read format, and accepts data from the data unit 13 when data is to be written onto the tape 28 by the MR head 36. The tape drive of FIG. 1 is generally of the ½ inch type having a single reel cartridge. As is well known in the tape drive industry, other media formats are also available, for example quarter inch cartridge (QIC), digital linear tape (DLT), digital analog tape (DAT), and video (19 mm), etc.

The MR head 36 can take the form of a number of well known construction types and arrangements. Thin film photolithography construction makes it possible to maximize use of the surface area of the magnetic tape, since narrow, closely placed tracks can be written. Transversely adjacent head elements are not operative at the same time, thus minimizing the possibility of cross-talk and the like. In the preferred embodiment of a thin film transducer used for the MR head 36, the write element is an inductive write element comprising two layers of magnetic material, driven by a thin film coil formed by standard photolithographic steps. The preferred read element is a magneto-resistive element. The MR read gaps are preferably of the soft film biased (SFB) type.

Figure 2:
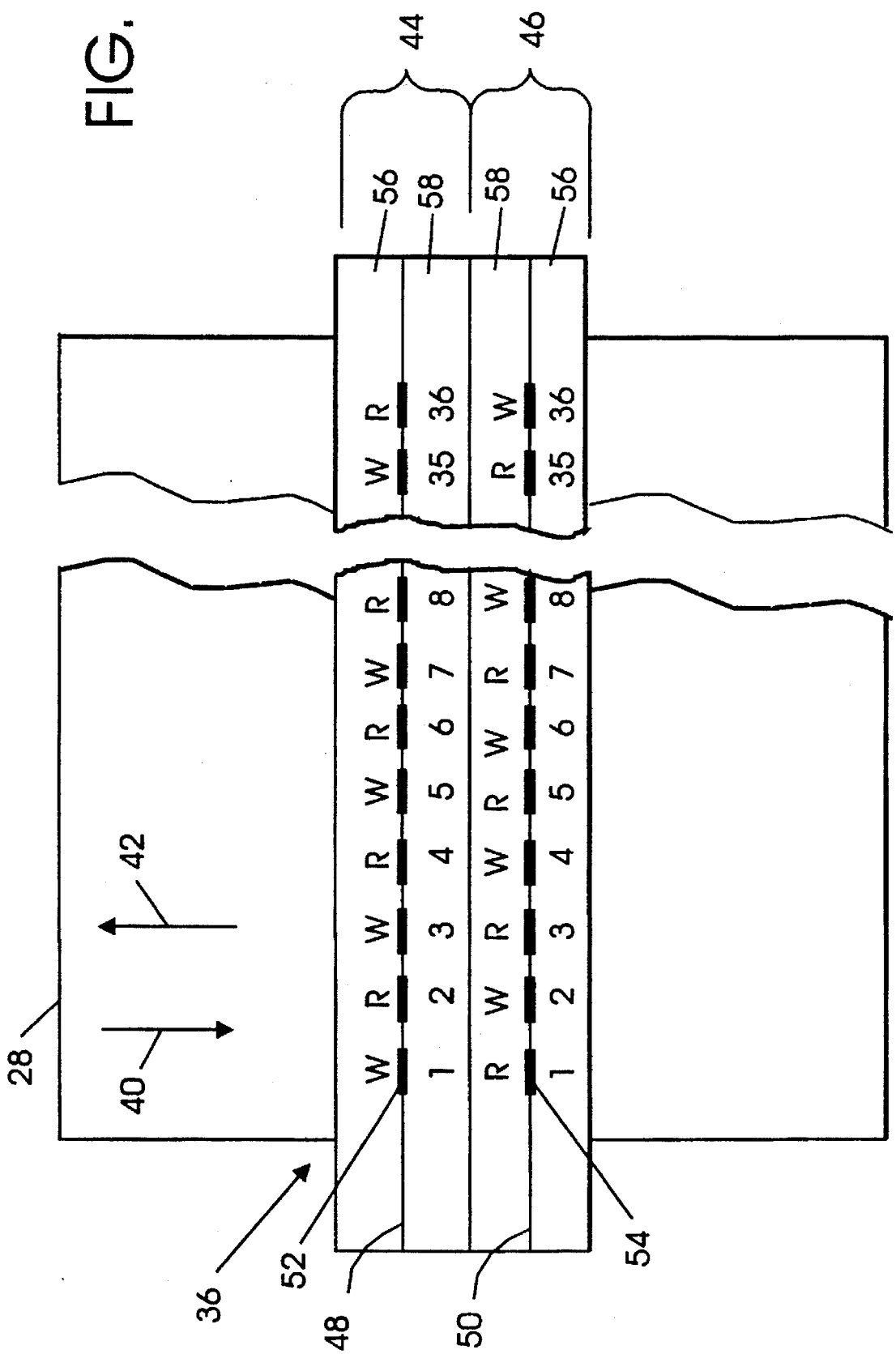
FIG. 2 is a top view of a length of magnetic tape and its relationship to an interleaved magnetic head.

Referring to FIG. 2, the read elements are marked "R" for the MR head 36 while the write elements are marked "W". The read and write gaps are used in immediately alternating odd/even fashion. The term alternating is intended to include other formats. For example, one format provides that the odd numbered tracks, tracks 1, 3, 5, and so on are operative during forward tape movement, while the even numbered tracks 2, 4, 6 and so on are operative during the opposite direction of tape movement. Other formats useable in the practice of the present invention will of course be evident to those skilled in the art, and are considered to be within the teaching of the present invention.

Generally, the length of magnetic tape 28 moves in both a forward and a reverse direction as indicated by the arrows 40 and 42. The arrow 40 designates the forward movement of direction of the tape 28 and the arrow 42 designates the reverse direction. The magnetic tape 28 operates in transducing relationship with the MR head 36 in the standard well known format. The MR head 36 includes two modules 44 and 46 of generally identical construction. The modules 44 and 46 are mounted together to form a single physical unit. In this manner, the transducing gaps of one module are not only closely spaced to the transducing gaps of the other unit, but also, the module gaps are accurately aligned in the direction of tape movement.

Each module 44, 46 includes one gap line 48, 50, respectively, to form the single physical unit of MR head 36. The individual gaps of each module 44, 46 are accurately located along the gap lines 48, 50. The gap lines 48, 50 are parallel and the MR head 36 is mounted in the tape drive (FIG. 1) such that the gap lines 48, 50 are perpendicular to the direction of tape movement as represented by arrows 40, 42. The MR head 36 includes the alternating read/write gaps along the length of each of the gap lines 48, 50 for each of the modules 44, 46. There are 18 read transducers and 18 write transducers in each of the modules 44, 46. Magnetic tape 28, therefore, has at least thirty six tracks its one half inch width. The tracks are written approximately thirty five percent wider than the read gaps are able to read. The gaps of one module, module 44 for instance, cooperate with the identically numbered gaps of the module 46. Thus, gaps identified as "1" through "36" of module 44 cooperate with gaps identified as "1" through "36" of module 46. The read gaps of one module are aligned with the write gaps of the other module and vice versa. Thus a write gap 52 of module 44 is aligned with a read gap 54 of module 46. Each of the modules 44, 46 include a substrate 56 and a closure piece 58.

Figure 3:
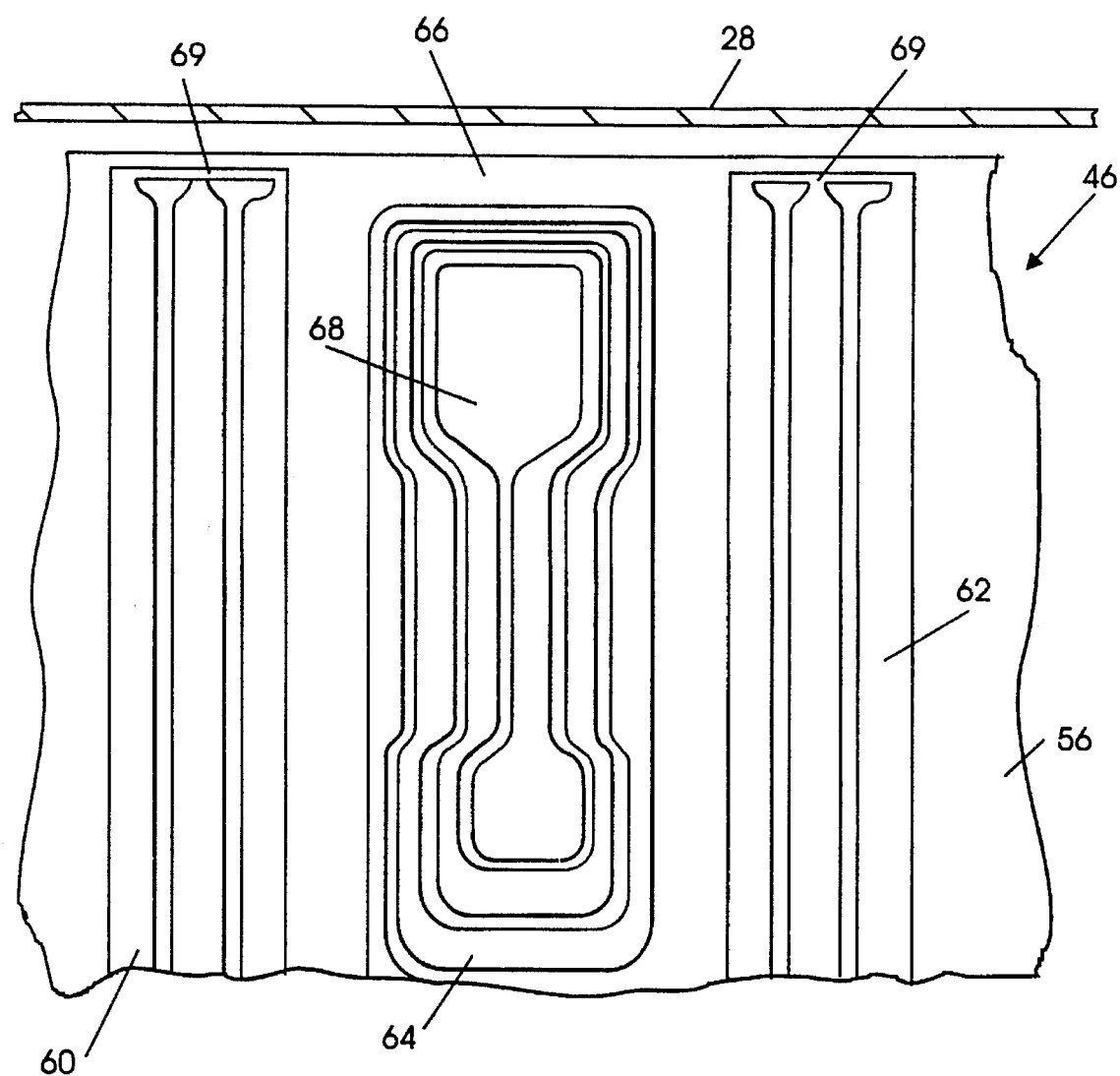
FIG. 3 is a sectional view of a portion of an interleaved head.

FIG. 3 depicts a portion of the thin film structure of the MR head 36. The module 46 is shown in a cut-away section with two thin film magneto-resistive read elements 60, 62 deposited onto the substrate 56. One thin film write coil 64 is shown positioned adjacent to the two MR read elements 60, 62. The transducing gap of the substrate 56 is shown at reference numeral 66. A back gap region 68 completes the magnetic circuit that is energized by the write coil 64. The closure 58 (not shown) is then affixed to the substrate 56. An MR shield enclosing the MR read transducers are described in detail below.

Figure 4:
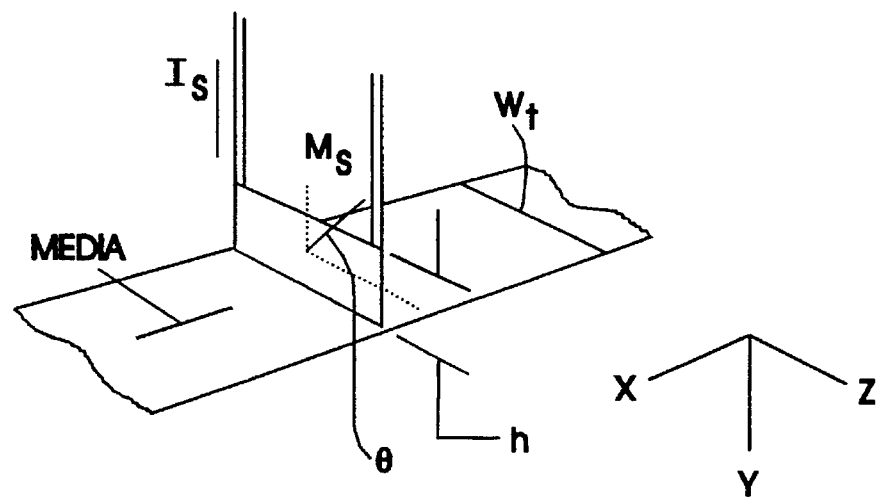
FIG. 4 is a schematic representation of a prior art magneto-resistive sensor stripe geometry.

FIG. 4 shows an MR read sensor strip geometry known in the art. In its simplest form, the MR read sensor consists of a narrow strip of magneto-resistive materials such as NiFe, NiCo or CoFe, of height h and width Wt. The stripe is mounted in a plane perpendicular to the recording medium and connected to conductors at each end carrying a sense current Is. Because of the magneto-resistive effect, the resistivity of each portion of this stripe depends on the angle theta between the direction of magnetization Ms and the current density vector, as is well known in the art. In general, the magnetization vector Ms represents the sum of a local bias field and the field from the recording medium. Because the device essentially responds to the average applied magnetic field, the resolution of an unshielded stripe is practically limited to stripe height h. This disadvantage is offset by the much higher output signal levels from the MR stripe when compared to conventional inductive heads.

Figure 5:
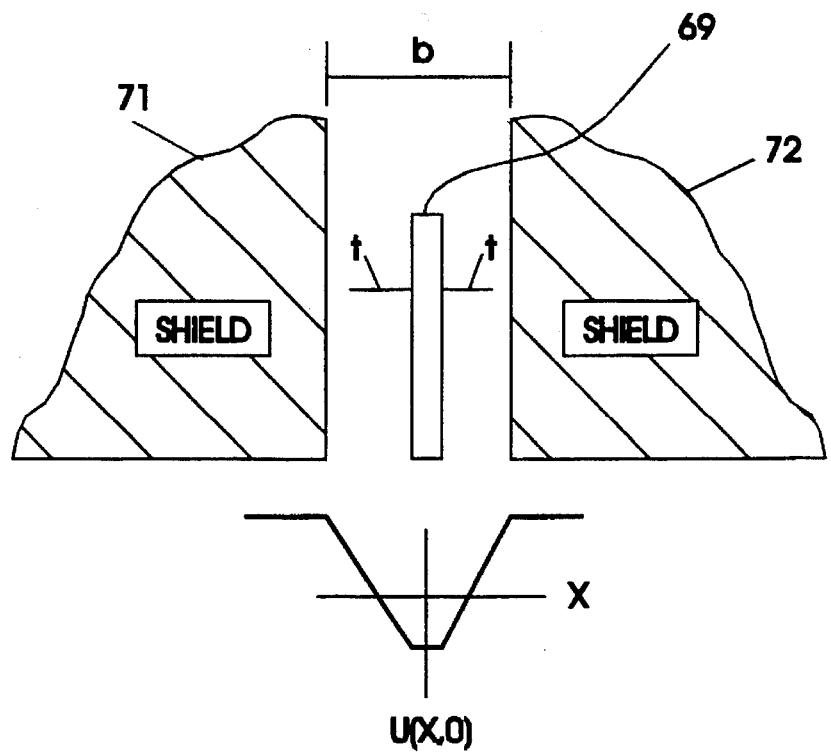
FIG. 5 is a schematic representation of a prior art shielded magneto-resistive stripe.

FIG. 5 shows the shielded MR stripe geometry known in the art. Two shields 71, 72 are disposed at a spacing (b) about the MR stripe 69, which is centered therebetween. Shields 71, 72, fabricated using a magnetic material, operate to prevent MR stripe 69 from experiencing the field in the recording medium until the recorded transition is within the gap width (b) of the MR stripe 69. The potential sensitivity function U(x,0) approximates the shape of the MR stripe 69 output responsive to the passage of a very narrow transition in a thin medium. Thus, as gap spacing (b) is reduced, the potential sensitivity function exhibits increased sensing resolution.

Thin film techniques are widely used for fabricating MR sensors because of the advantageous effects of very narrow gap separations (b) and stripe heights (h). It is known that shielding MR stripe 69 on both sides improves sensing resolution by preventing the MR stripe 69 from experiencing the field from the medium until the recorded transition is very close. Where the edge of the MR stripe 69 is recessed from a face of the MR head 36, the potential sensitivity broadens slightly and degrades with the amount of recession. Lateral displacement of the MR stripe 69 toward one of the shields does not substantially diminish element sensitivity. Very thin shields tend to provide the relatively low resolution characteristic of unshielded MR stripes.

Thin film shielded MR heads are susceptible to electrostatic discharge when used with certain types of media, for example, as discovered by the inventors of the instant invention, with high resistivity magnetic tape such as metal particle tape. Static charge buildup can occur due to debris adhering to the face of the MR head (e.g. triboelectric charging). The metal particle media does not provide a suitable path to ensure that the static charge can be dissipated via the tape housing or other points of contact to the magnetic tape. Environmental conditions such as low humidity can further exacerbate the problem. Electrostatic discharge typically results in a large narrow pulse being introduced into the data stream causing single and double bit errors. While error correction code (ECC) can be relied upon to correct most errors, the corresponding reduction in reliability is generally unacceptable.

Figure 6:
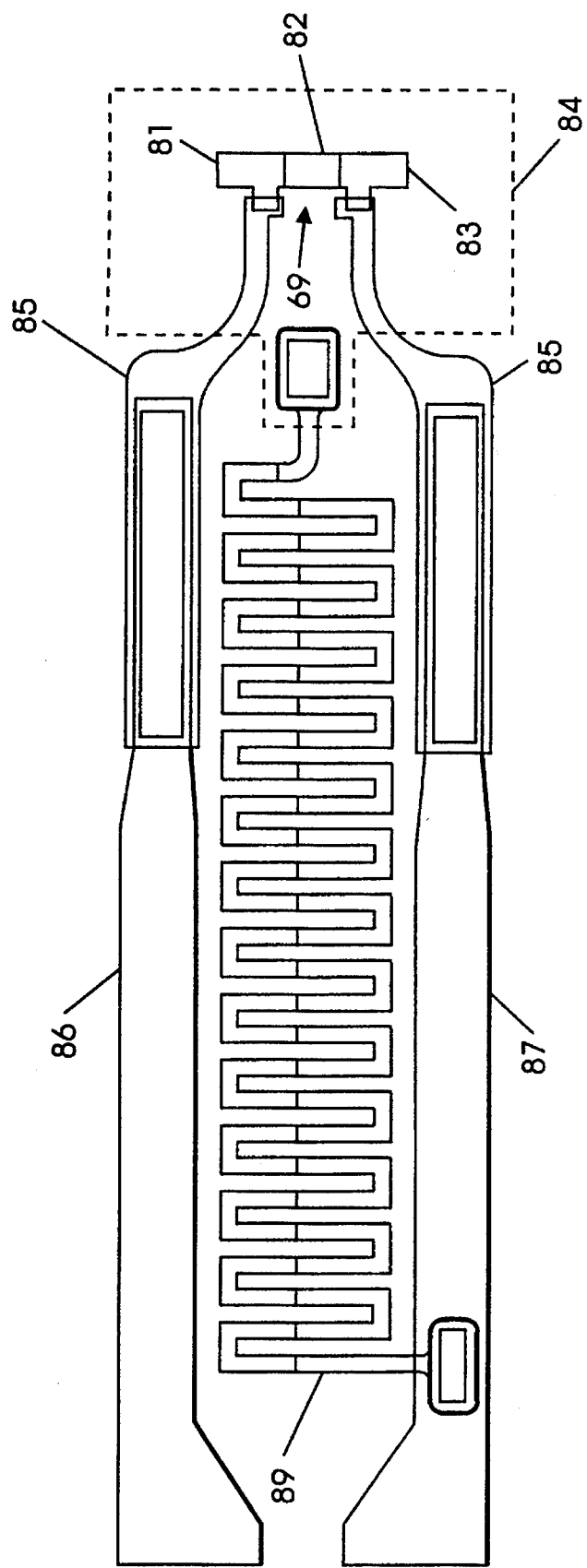
FIG. 6 is a plan view of a shielded MR sensor having electrostatic discharge protection according to a preferred embodiment of the present invention.

FIG. 6 is a top plan view of a MR sensor 69 having electrostatic discharge protection according to a preferred embodiment of the present invention. The MR sensor 69 comprises a magnetic soft film bias (SFB) material 82, for example, NiFe/Ta/NiFeRh, sandwiched between two high resistivity permanent magnets 81, 83, for example, Cr/CoPtCr magnetic material. The MR sensor 69 has MR shields thereabove and therebelow (only MR shield 84 is shown since the bottom MR shield is directly below). Simply grounding the MR shields should assure that the MR sensor 69 does not accumulate charge thus avoiding the charging problem. However, an additional connection for grounding further complicates the tape head by potentially increasing a number of process steps and further a number of pinouts which may already be exhausted. Additional problems include potential shorting, pinholes and smearing sensitivity. Still further, simply grounding the MR shield 84 may result in a catastrophic failure of the MR sensor 69 due to the potentially large current created therein. Also, the potential difference between the MR sensor 69 and the MR shield 84 is increased by any voltage drop across the MR leads and bias circuit (not shown) if the shield is grounded. These problems are avoided by grounding the MR sensor shield 84 through a resistor 89 to a ground signal lead 87. The resistor 89 is constructed from like high resistivity permanent magnet material as the elements 81, 83. Hence, the resistor 89 is defined with the same mask layer and is processed simultaneously therewith thereby avoiding additional processing requirements. Similarly, vias contacting the resistor 89 to MR sensor shield 84 and to ground signal lead 87 are processed simultaneously as those vias processed for contacting the signal leads 86 and 87 to the elements 81, 83, respectively.

The resistor 89 is typically several kilo-ohms and in the event that a short or pinhole occurs in the MR shield 82, results only in a negligible MR change. Therefore, the MR sensor 69 will continue to operate while being protected from electrostatic discharge. Leads 85 are thin gold leads connecting to signal leads 86 and 87 (thick gold leads) which continue to the lead attach.

In summary, a magneto-resistive (MR) head has been described having circuitry providing electrostatic protection for each MR read sensor. The MR head also includes least one write gap for each MR sensor. The MR head is fabricated such that no additional processing steps or photolithographic masks are required to provide effective electrostatic protection. An MR shield is located both above and below each MR sensor. First and second permanent magnets are located at first and second ends of MR read sensor and first and second thin gold leads are coupled to the first and second permanent magnets, respectively. First and second thick gold signal leads are coupled to the first and second thin gold leads respectively, the first and second thick gold leads being provided for contacting signal and ground terminals, respectively. A resistor, comprising a same permanent magnet material as the first and second permanent magnets, is coupled between the first MR shield and the second thick gold lead, the resistor providing a path to ground for dissipating static charge buildup on the MR head.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, etc. Still further, means for attaching structures together may be changed without departing from the scope of the invention. The use of electrostatic protected MR heads is not meant to be limited to magnetic tape or disk application, but is meant to be extended to the use of MR heads generally.

What is claimed is:

1. A magneto-resistive (MR) head for sensing magnetic flux signals provided by a source external from and proximate to said MR head, said external source generating a static charge buildup on said MR head, said MR head further including a signal lead and a ground lead, said MR head comprising:

at least one MR read transducer for reading magnetic flux signals, said MR read transducer comprising a soft film bias magnet having first and second ends and first and second high resistivity permanent magnets connected to said first and second ends, respectively;

at least one MR shield for shielding the magnetic flux signals from said at least one MR read transducer until the magnetic flux signals are within a predetermined distance of said MR read transducer; and a resistor coupled between said at least one MR shield and a ground signal for discharging the static charge buildup from said MR head, wherein said resistor comprises a high resistivity permanent magnet material.

2. The MR head according to claim 1 wherein further comprising at least one write gap for generating magnetic flux signals for application to said external source.

3. The MR head according to claim 2 wherein said resistor is coupled between said second high resistivity permanent magnet and said ground lead, said resistor being of like material as said second high resistivity permanent magnet and said resistor being fabricated in a same processing step as said second high resistivity permanent magnet.

4. The MR head according to claim 1 wherein said external source is a magnetic tape.

5. A magneto-resistive (MR) head for writing data to and reading data from high resistivity magnetic tape, said MR head providing electrostatic protection from static charge buildup resulting from said magnetic tape passing over said MR head by shunting the static charge buildup to a ground lead, comprising:

a plurality of write transducers;

a plurality of MR read transducers, each MR read transducer of said plurality of MR read transducers comprising:
a soft film bias (SFB) magnet; and
first and second high resistivity permanent magnets sandwiching said SFB magnet;

first and second shields above and below each MR read transducer of said plurality of MR read transducers; and a resistor coupling each MR shield to a ground lead.

6. The MR head according to claim 5 wherein each resistor is formed from the same material as said first and second high resistivity magnets.

7. The MR head according to claim 5 wherein said first and second shields are comprised of a magnetic material.

8. In a magnetic tape drive, a method of reducing single and double bit errors due to static charge build-up at a magneto-resistive (MR) head due to a magnetic storage medium passing by the MR head, wherein said MR head comprises a plurality of MR read transducers and a corresponding plurality of write transducers, said method comprising steps of:

(a) shielding each MR read transducer with first and second MR shields, wherein said MR read transducers are comprised of soft film bias material sandwiched between high resistivity permanent magnet materials;

(b) providing a resistive path from each MR shield to a ground lead of each MR read transducer of said plurality of MR read transducers, wherein said resistive path is realized by a resistor formed of high resistivity permanent magnet material;

(c) passing the magnetic storage medium past said MR head; and (d) shunting a static charge buildup on said MR head from each MR shield through said resistive path.

9. The method according to claim 8 wherein said magnetic storage medium passed by said MR head is a metal particle magnetic tape.

10. A magneto-resistive (MR) head having at least one MR read sensor and at least one write gap, said MR head providing electrostatic protection for said at least one MR read sensor from static charge buildup building thereon and generated by an external source, comprising:

a first MR shield located above said MR sensor;

a second MR shield located below said MR sensor;

first and second permanent magnets located at first and second ends of said MR read sensor;

first and second thin gold leads coupled to said first and second permanent magnets, respectively;

first and second thick gold signal leads coupled to said first and second thin gold leads respectively, said first and second thick gold leads provided for contacting signal and ground leads, respectively; and a resistor, comprising a same permanent magnet material as said first and second permanent magnets, coupled between said first MR shield and said second thick gold lead, said resistor providing a path to ground for dissipating static charge buildup on said MR head.

11. The MR head according to claim 10 wherein said resistor is located substantially between said first and second thick gold leads.

12. The MR head according to claim 10 wherein said external source is a magnetic tape.

* * * * *